United States Patent
Kobayashi et al.

[11] Patent Number: 5,224,656
[45] Date of Patent: Jul. 6, 1993

[54] METHOD OF AND APPARATUS FOR PRODUCING A GRANULAR PRODUCT

[75] Inventors: Masaru Kobayashi; Hideo Yamazaki, both of Shizuoka; Satoshi Nagumo, Niigata, all of Japan

[73] Assignees: Okawara Mfg. Co., Ltd.; Funken Powtechs, Inc., both of Japan

[21] Appl. No.: 931,723

[22] Filed: Aug. 18, 1992

[30] Foreign Application Priority Data

Aug. 20, 1991 [JP] Japan ................... 3-293962

[51] Int. Cl.⁵ ............................................. B02C 23/18
[52] U.S. Cl. .................................. 241/21; 241/188.2; 241/277
[58] Field of Search ................ 241/21, 62, 188.2, 277, 241/278.1, 46.04, 285.2

[56] References Cited

U.S. PATENT DOCUMENTS

| | | | |
|---|---|---|---|
| 3,044,720 | 7/1962 | Bridgewater | 241/275 |
| 3,123,116 | 3/1964 | Hughes | 241/278.1 |
| 4,691,867 | 9/1987 | Iwako et al. | 241/21 |
| 5,018,671 | 5/1991 | Tanimoto et al. | 241/16 |

FOREIGN PATENT DOCUMENTS

0146820 7/1985 European Pat. Off. ......... 241/285.2

Primary Examiner—Mark Rosenbaum
Assistant Examiner—John M. Husar
Attorney, Agent, or Firm—Bruce L. Adams; Van C. Wilks

[57] ABSTRACT

A method of and an apparatus for producing a granular product from an admixture of a powdery material and a liquid binder. The apparatus comprises a casing, a rotor rotatably mounted therein and having a plurality of blades, an annular sleeve movable eccentrically relative to the casing and a plurality of shifters adapted to move the sleeve radially toward and away from the rotor across a spacing or gap circumferentially defined between the sleeve and the blades. The method essentially comprises varying the spacing or gap at selected circumferential areas over predetermined time intervals during operation of the apparatus so as to remove the admixture tending to deposit in the interior of the casing.

5 Claims, 9 Drawing Sheets

METHOD OF AND APPARATUS FOR PRODUCING A GRANULAR PRODUCT

BACKGROUND OF THE INVENTION

1. Field of the Invention

This invention relates to a method of producing a granular product from an admixture of a powdery material and a binder and an apparatus for carrying this method into practice.

2. Prior Art

There are known a variety of granulating machines for processing particulate or powdery materials into granules of a predetermined size. A typical conventional high-speed granulator is shown in FIGS. 10a and 10b which is designed to produce a granular article by mixing a starting fine particulate material with stirring. This granulator comprises a disc-like rotor 100 rotatably mounted in a casing 101 and adapted to admix a particulate feedstock F with a liquid binder B fed from above. This admixture is centrifugally forced against the peripheral wall 102 of the casing 101 and vigorously stirred by the action of blades 103 secured peripherally to the rotor 100 until there is produced a continuous flow of product granules of a size determined by a given spacing or clearance between the blade 103 and the casing wall 102. The particulate material F when mixed with the binder B assumes the form of a viscous paste and tends to deposit on the casing wall 102 where indicated at D in FIG. 10b over an extended period of operation. This would result in reduced or varied spacing between the blade 103 and the casing wall 102 and hence irregular or otherwise defective granular product. In a worst instance, the deposit D would grow so large as to reach and interfere the normal rotation of the blades 103, leading to ultimate shut-down of the machine.

It has been proposed to use a resilient material such as synthetic rubber, rubber/cloth composite and the like for a tubular wall member corresponding to the casing wall 102 such that deposit D accumulated thereon can be scraped off by knocking the tubular member from outside at certain time intervals during operation of the machine. However, the use of such resilient tubular wall entailed a difficulty in maintaining a proper wall to blade spacing so that the resulting granular product would become irregular in its size or diameter, not to speak of the resilient wall being susceptible to physical deformation or damage due to repeated knocking.

SUMMARY OF THE INVENTION

With the foregoing difficulties of the prior art in view, the present invention seeks to provide a method of and an apparatus for producing a granular product having a substantially uniform size distribution at increased rate of yield.

More specifically, the invention is directed to eliminating the accumulation or deposition of a processing material in the interior of a granulating machine which would otherwise result in defective granular product or shut-down of the machine.

According to one aspect of the invention, there is provided a method of producing a granular product from an admixture of a powdery material and a binder with the use of an apparatus comprising a granulating rotor having a plurality of blades and rotatably mounted in a cylindrical casing having a peripheral wall, the blades and the peripheral wall defining therebetween an annular circumferential spacing, the method comprising admixing a powdery feedstock with a liquid binder; granulating the admixture into granules of a predetermined size; and varying the spacing at selected circumferential areas of the rotor alternately over predetermined time intervals during operation of the apparatus.

According to another aspect of the invention, there is provided an apparatus for producing a granular product from an admixture of a powdery material and a binder which comprises: a cylindrical casing defining therein a compartment for receiving a granular product; an annular sleeve mounted in and movable eccentrically relative to the casing; a rotor rotatably mounted concentrically in the casing for granulating an admixture of a powdery feedstock and a liquid binder and having a plurality of blades for removing the admixture tending to deposit on the sleeve, the blades and the sleeve defining therebetween an annular circumferential spacing; and a plurality of shifters movable radially toward and away from the sleeve to vary the spacing at predetermined time intervals.

The above and other features and advantages of the invention will be better understood from reading the following detailed description with reference to the accompanying drawings. Like reference numerals refer to like or corresponding parts throughout the several views.

DETAILED DESCRIPTION OF THE INVENTION

Figures 1A, 1B:
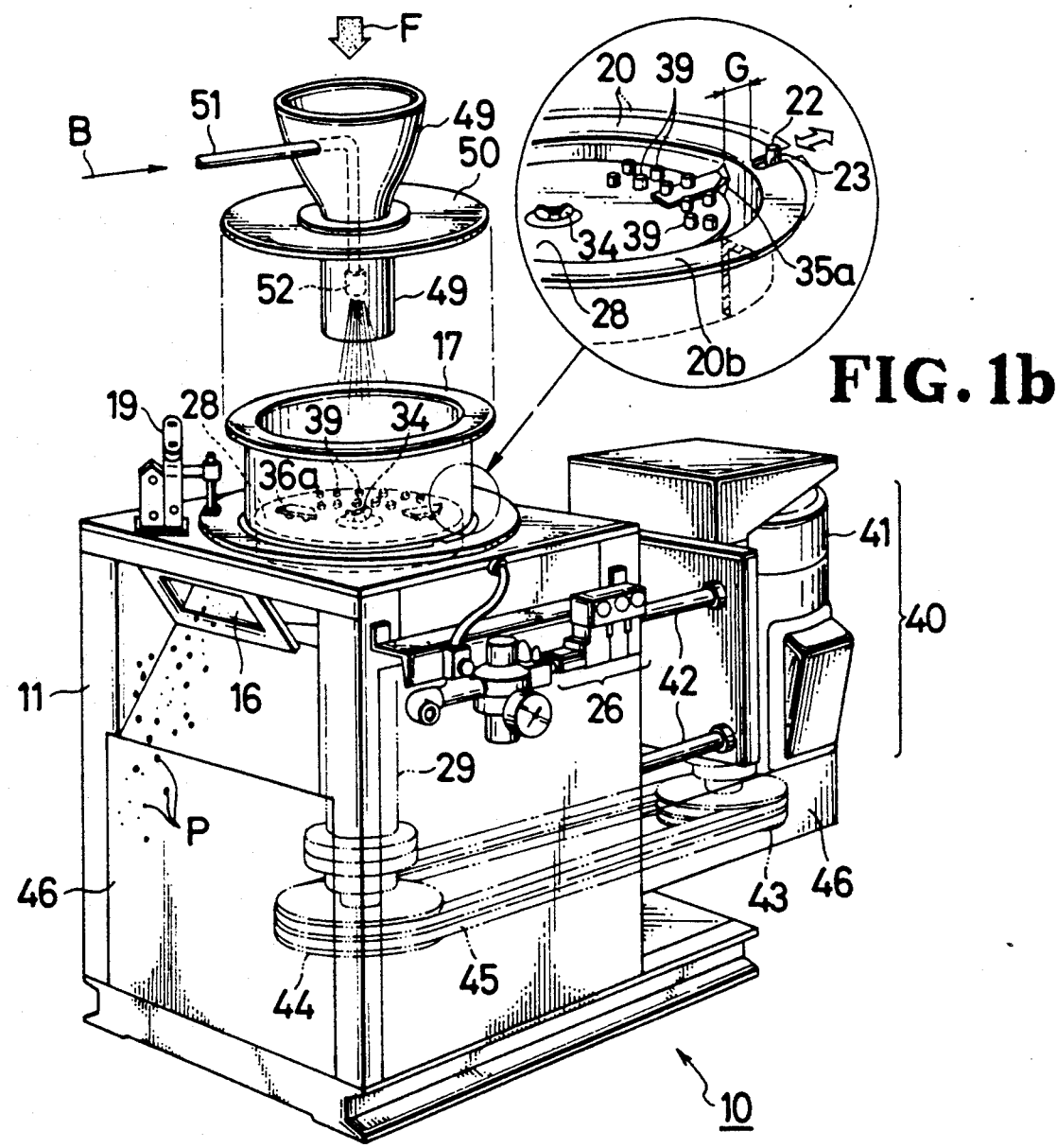
FIG. 1a is a perspective view and FIG. 1b is an enlarged view of an apparatus embodying the invention.

Referring now to the drawings, there is shown an apparatus 10 constructed in accordance with the invention for granulating a powdery feedstock into a granular product of a predetermined size. The apparatus 10 comprises a support frame 11 and a cylindrical casing 12 mounted thereon and having a dual wall structure comprised of an outer peripheral wall 13 and an inner peripheral wall 14, defining therebetween an annular compartment 15 communicating tangentially with an outlet 16 through which a granulated product P is withdrawn.

Mounted concentrically above the casing 12 is a drum 17 defining therein a stirring chamber 18 communicating with the compartment 15, the drum 17 having a peripheral flange 17' secured externally to the casing 12 by means of clamps 19.

According to an important aspect of the invention, there is provided an annular sleeve 20 dimensioned to be movable eccentrically with respect to the casing 12 and adapted in effect to constitute an inner wall surface of the casing 12 for contact with a feedstock F in a manner later described. As better shown in FIG. 4, the sleeve 20 has a peripheral inner wall surface 20a disposed for impinging contact with the feedstock F and an outwardly directed flange 20b and is radially movably supported between the peripheral flange 17' of the drum 17 and an inwardly projecting annular portion 13a of the outer wall 13 of the casing 12 through the medium of packings 21 of a fluoroplastics such as Teflon. A plurality of guide pins 22 extend between the flange 17' of the drum 17 and the outer wall 13 of the casing 12 through an elongate guide slot 23 formed in the flange 20b of the sleeve 20.

Figure 3A:
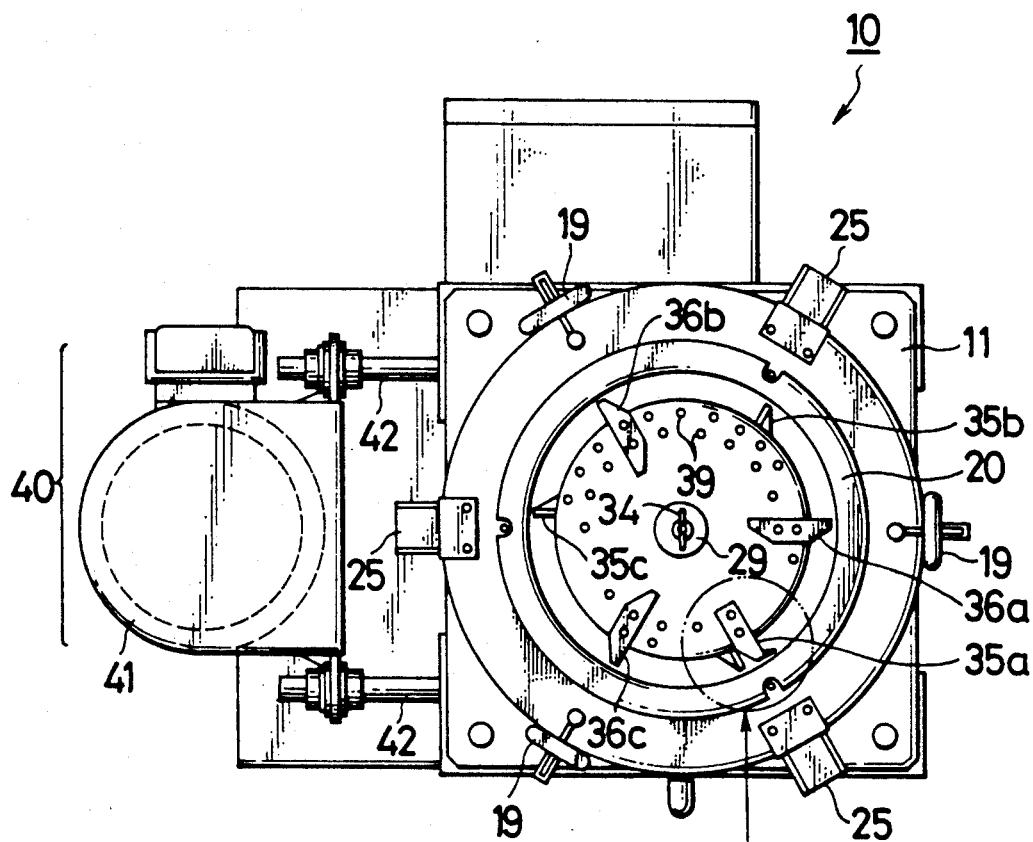
FIG. 3a is a plan view and FIG 3b is an enlarged view of the same.
Figure 3B:
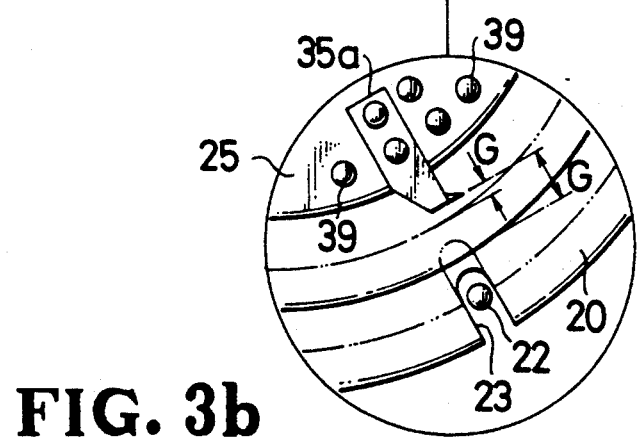

Designated at 24a, 24b and 24c are shifters each in the form of a piston rod extending from a pneumatically operated cylinder 25 and spaced equally circumferentially around the casing 12 as shown in FIG. 3. Each of the shifters 24a, 24b and 24c extends through the outer peripheral wall 13 of the casing 12 to be movable radially toward and away from the sleeve 20. The cylinders 25 are connected to and controlled by respective pneumatic control valves 26 (FIG. 1) so that the stroke of each of their associated piston rods, i.e. the movement of each of the shifters with respect to the sleeve 20 is controlled to determine the extent of eccentric displacement of the sleeve 20 relative to the casing 12.

A stopper pin 27 is provided to hold the sleeve 20 in concentric relation to the casing 12, or retain the sleeve 20 in a given eccentric position relative to the casing 12. This pin 27 may be however substituted for example by a suitable shim member (not shown) which may be applied to the operating end of the shifter 24a (24b, 24c).

Figures 2A, 2B:
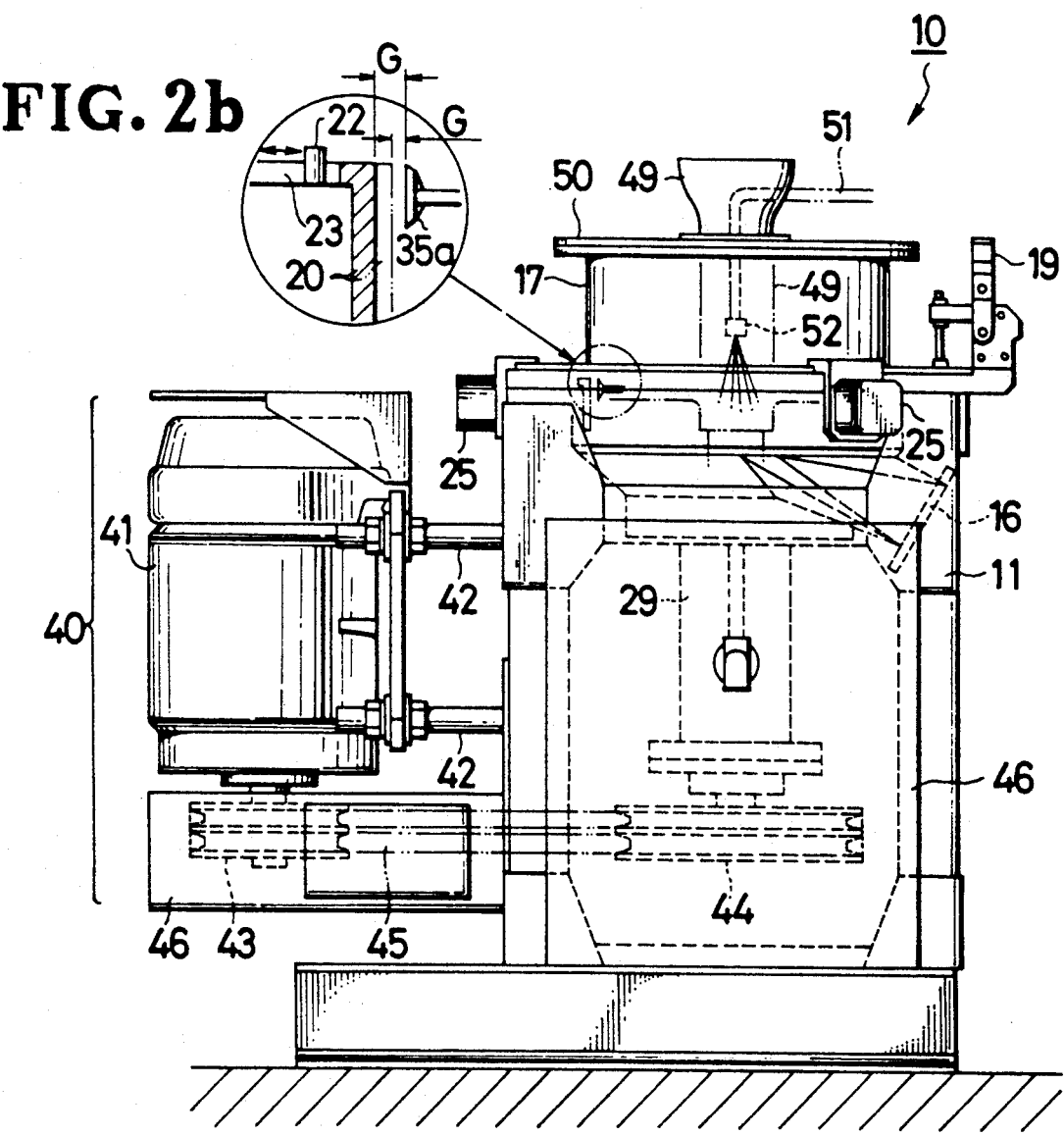
FIG. 2a is a front elevational view and FIG. 2b is an enlarged view of the same.
Figures 4A, 4B:
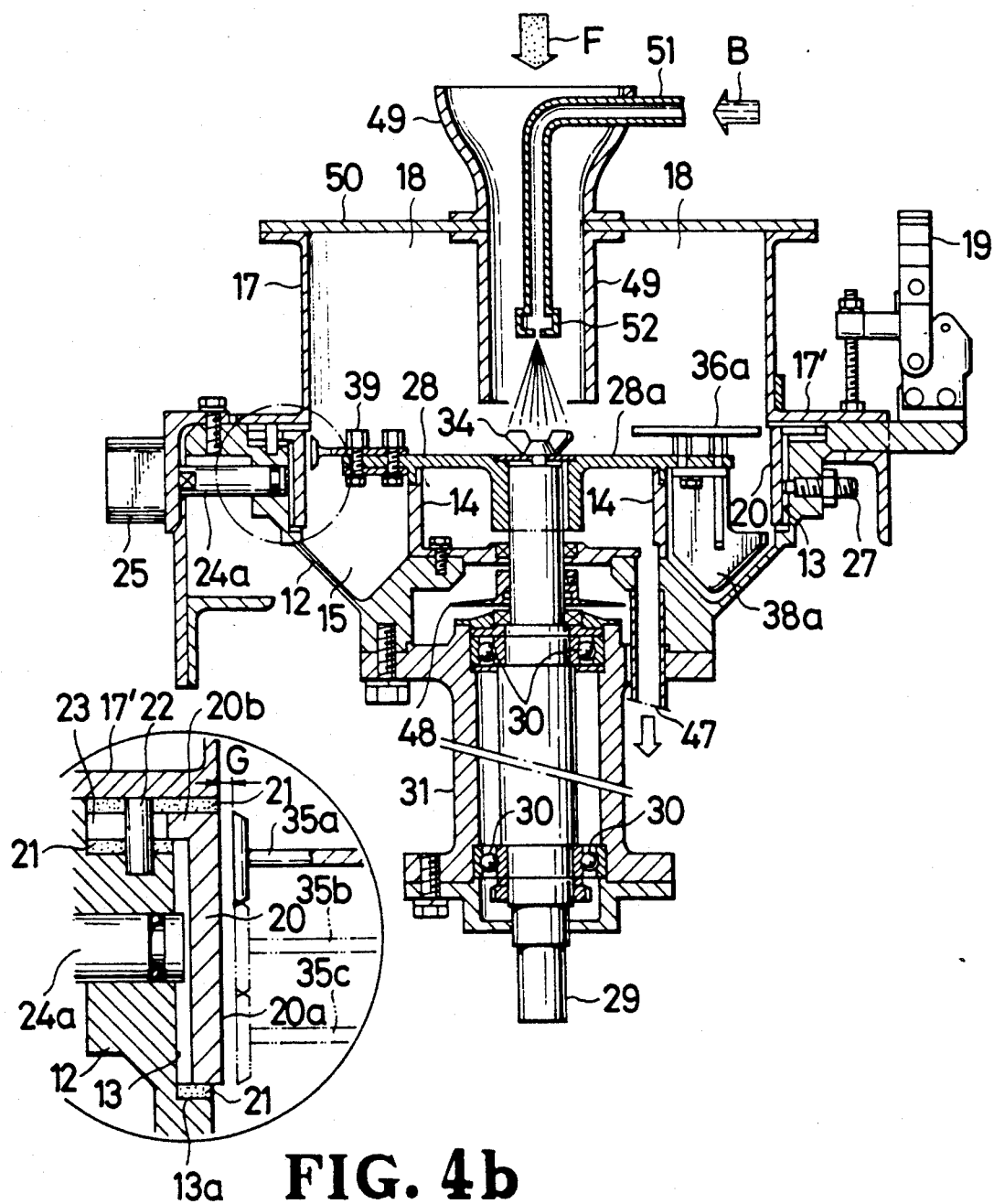
FIG 4a is a longitudinal cross-sectional view and FIG. 4b is an enlarged view of the same.
Figure 5:
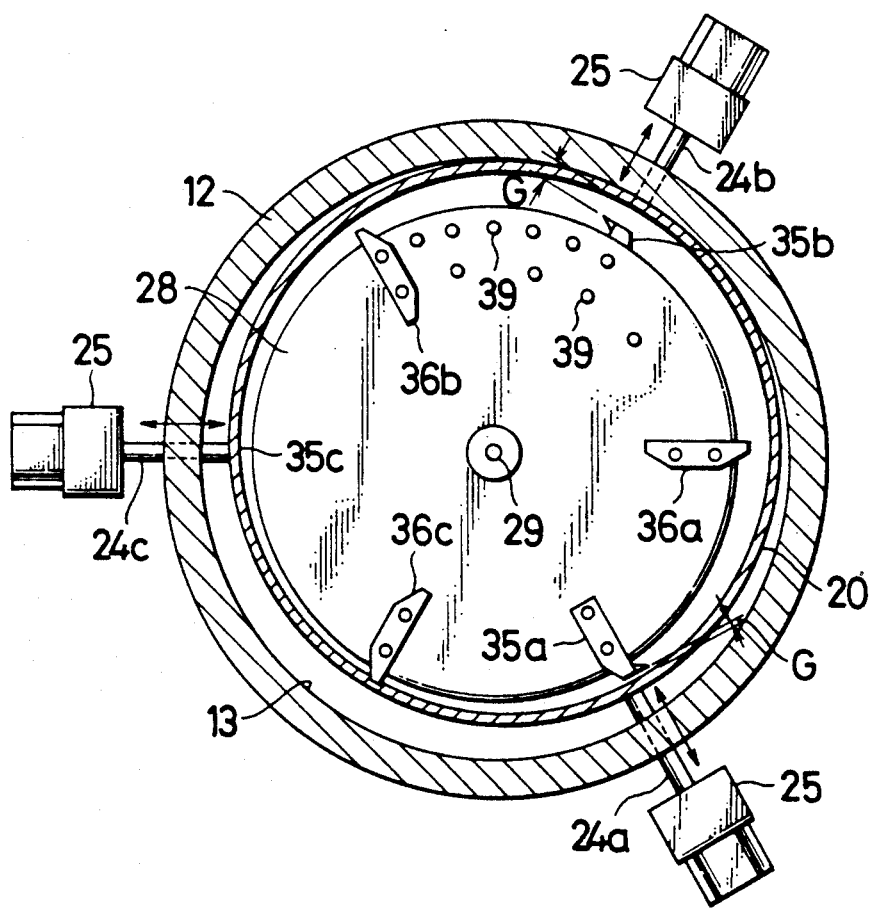
FIG. 5 is a plan view of a portion of the apparatus which incorporates a means of adjusting the spacing between a sleeve and a blade.
Figure 6:
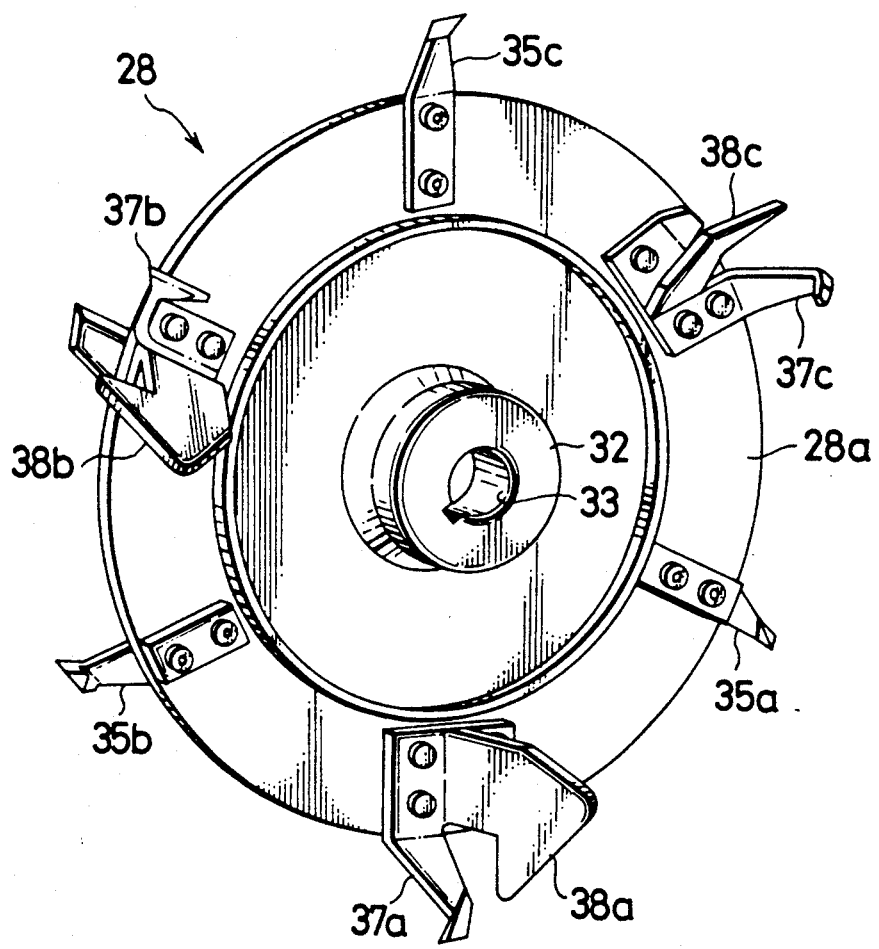
FIG. 6 is a perspective view of a reverse side of a rotor.

A granulating rotor 28 mounted concentrically in the casing 12 has an upper surface 28a exposed for direct contact with a mixture of feedstock F and binder B and is rotatably mounted on a vertically extending rotary shaft 29 journalled through bearings 30 in a bearing housing 31 secured to the bottom of the casing 12 as better shown in FIGS. 2 and 4. The rotor 28 has a hub 32 with a through-opening 33 threadedly engageable with a butterfly bolt 34 which connects the rotor 28 to the shaft 29.

According to a preferred embodiment shown in FIGS. 3 to 6 inclusive, the rotor 28 is provided with three blades 35a, 35b and 35c spaced equally 120° apart around its circumference and extending upwardly at respective levels substantially equally dividing the full height of the sleeve 20 as better shown in FIG. 4 and in close proximity to the inner surface 20a of the sleeve 20 across an annular circumferential spacing or gap G which is variable as later described. The rotor 28 is also provided with a set of three upwardly projecting equally spaced scrapers 36a, 36b and 36c on its upper peripheral portion and another set of three downwardly projecting equally spaced scrapers 37a, 37b and 37c on its lower peripheral portion as better shown in FIGS. 5 and 6. The rotor 28 is further provided with three equally spaced vanes 38a, 38b and 38c extending downwardly into and substantially conforming in shape with the compartment 15 in the casing 12. A multiplicity of stirring pins 39 are mounted on the upper face of the rotor 28 adjacent to its peripheral region as better shown in FIG. 5.

The granulating rotor 28 is driven by a drive unit 40 which comprises a motor 41 adjustably supported on a plurality of stays 42 extending horizontally from the frame 11, a drive pulley 43 connected to the motor 41, a driven pulley 44 connected to the rotary shaft 29, and a drive belt 45 trained around and between the pulleys 43 and 44. This drive arrangement is well known and will require no further explanation. Designated at 46 is a covering wall member provided for safety purposes and protection of the interior operating parts.

Designated at 47 is a drain pipe connected to the bottom of the casing 12 for draining the feedstock F which may inadvertently enter into the interior of the casing 12.

A cover flange 48 is provided above the bearing housing 31 to prevent intrusion of a feedstock, particularly moisture into the operating parts.

The feedstock F is supplied through a feed duct 49 extending vertically centrally through a cover 50 of the drum 17 and introduced into the chamber 18 wherein it is mixed with a liquid binder B supplied via a feed pipe 51 which extends concentrically within the feed duct 49 and has a spray nozzle 52 at its tip end, as better shown in FIG. 4.

With this construction, the apparatus 10 operates as follows. The motor 41 is started to effect rotation of the granulating rotor 28 within the casing 12 at a predetermined speed dependent upon the specific physical properties of particulate feedstock F and binder B used as well as upon a particular specification of a granular product P desired. The feedstock F is fed through the duct 49 into the chamber 18 and admixed therein with the liquid binder B sprayed or otherwise atomized by the nozzle 52. The admixture of F and B is vigorously stirred by the coaction of the rotor surface 28a and the pins 39 and blown against the inner wall surface 20a of the sleeve 20 under the influence of surrounding whirling air current and centrifugal force produced by the high speed rotation of the rotor 28, during which time the admixture is beaten by the blades 35a, 35b and 35c substantially into granules of a predetermined average diameter and then taken into the compartment 15 where the resulting granular product P is collected by the vanes 38a, 38b and 38c for withdrawal from the casing 12.

Figure 10A:
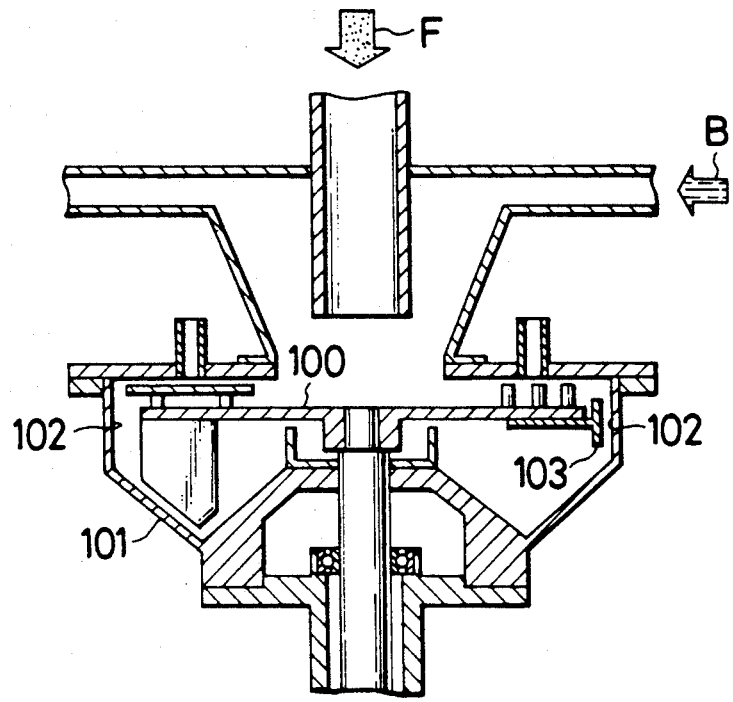
FIGS. 10a and 10b are schematic cross-sectional views of a prior art granulating machine.
Figure 10B:
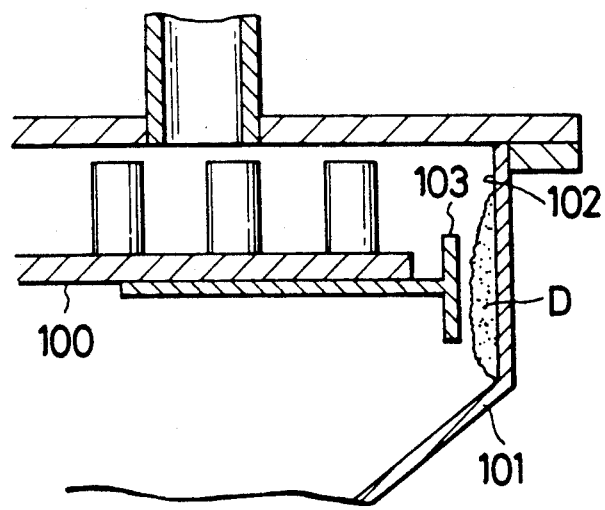

During the course of the above granulating operation, there is a tendency of the admixture of feedstock F and binder B to become deposited in the interior of the casing 12, particularly on the inner peripheral wall surface 20a of the sleeve 20. This is eliminated or alleviated by the inventive arrangement in which the sleeve 20 is allowed to move eccentrically with respect to the casing 12 across the annular circumferential spacing G, i.e. radially toward and away from the blades 35a, 35b and 35c on the rotor 28 selectively at predetermined time intervals by the action of the respective shifters 24a, 24b and 24c so that the particular blade approaching closer to the sleeve 20 scrapes the deposit D (FIG. 10b) off its inner wall surface 20a. In other words, removal of the deposit from the sleeve 20 is effected where a relative spacing or gap G between the inner wall surface 20a of the sleeve 20 and the tip end of each of the respective blades 35a, 35b and 35c is reduced to a minimum as better depicted in FIG. 5. Although this illustration is somewhat exaggerated, the distance of eccentric movement of the sleeve 20 relative to the casing 12 is generally in the range of 0.5 mm-several mm. In order to provide the eccentric movement of the sleeve 20 relative to the casing 12 or the movement of the sleeve 20 radially toward and away from the blade 35a (35b, 35c) of the rotor 28 with utmost efficiency and accuracy, there may be used preferably a computer programming such that the pneumatic control valve assembly 26 is controlled to actuate the cylinders 25 to selectively trigger their associated shifters 24a, 24b and 24c into alternate forward and backward strokes at predetermined intervals, so that the sleeve 20 is urged toward and away from the blades 35a, 35b and 35c in response to the particular shifter 24a (24b, 24c) triggered.

Figure 7A:
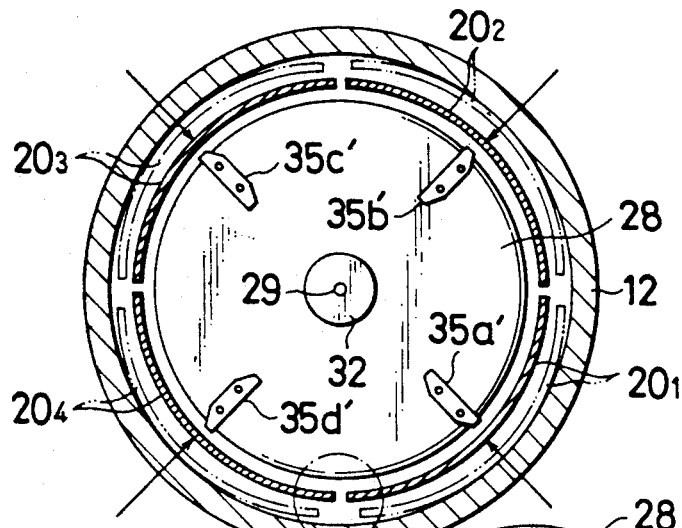
FIG. 7a is a schematic plan view and FIG. 7b is an enlarged view of a modified means of adjusting the sleeve-to-blade spacing.
Figure 7B:
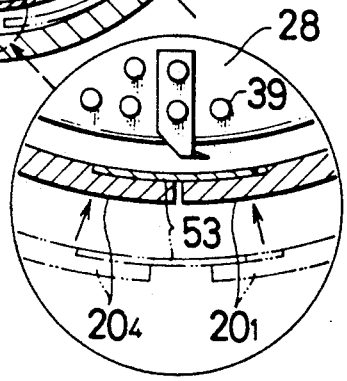

The important aspect of the invention involving the variation of the relative spacing or gap G between the sleeve 20 and the rotor blade 35a (35b, 35c) may be otherwise embodied as shown in FIG. 7 wherein the sleeve 20 is sub-divided into a plurality of, or four spaced arcuate sections $20_1$-$20_4$ as illustrated, which are arranged to move simultaneously or independently one from another radially toward and away from corresponding blades 35a'-35d'. A suitable cover strip 53 such as of a metal foil may be used to internally mask the gaps between adjacent sleeve sections $20_1$-$20_4$.

Figure 8:
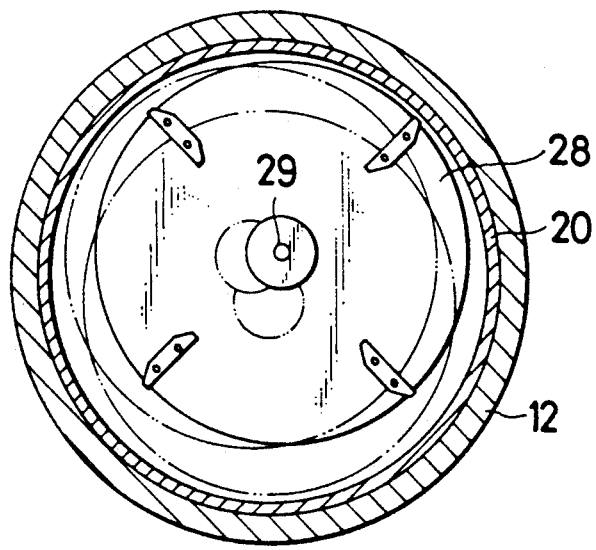
FIG. 8 is a schematic plan view of a further modified means of adjusting the sleeve-to-blade spacing.

FIG. 8 shows a modification in which the rotor 28 is made movable together with the rotary shaft 29 radially toward and away from or eccentrically relative to the casing 12.

Figure 9:
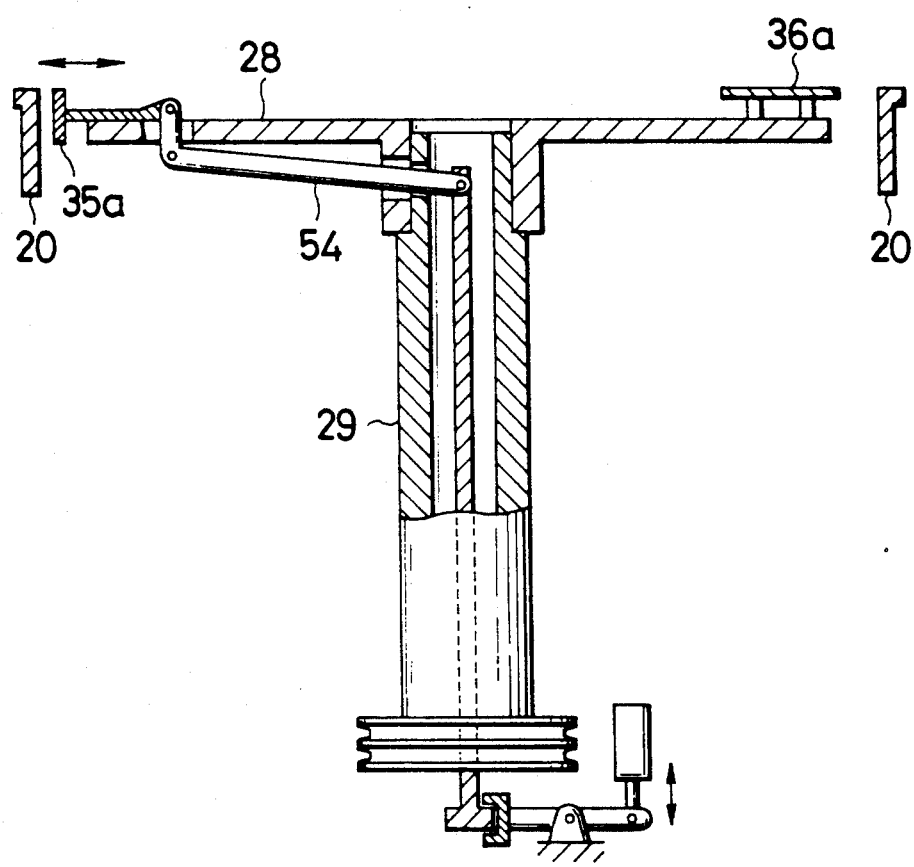
FIG. 9 is a schematic cross-sectional view of a still further modified means of adjusting the sleeve-to-blade spacing.

FIG. 9 shows another modification in which a shifting rod 54 extending from a variable pitch propeller used for example in a ship is employed to effect radial movement of the rotor blade 35a (35b, 35c) with respect to the sleeve 20.

Many other modifications and changes may be made in the specific embodiments of the invention herein above described as appears apparent to one skilled in the art without departing from the scope of the appended claims.

What is claimed is:

1. A method of producing a granular product from an admixture of a powdery material and a binder with the use of an apparatus comprising a granulating rotor having a plurality of blades and rotatably mounted in a cylindrical casing having a peripheral wall, said blades and said peripheral wall defining therebetween an annular circumferential spacing, the method comprising admixing a powdery feedstock with a liquid binder; granulating the admixture into granules of a predetermined size; and varying said spacing at selected circumferential areas of said rotor over predetermined time intervals during operation of said apparatus.

2. A method according to claim 1 carried into practice by said apparatus further including an annular sleeve mounted in and movable eccentrically relative to said casing, said sleeve defining with said blades an annular circumferential spacing, the method comprising admixing a powdery feedstock with a liquid binder; granulating the admixture into granules of a predetermined size; and varying said spacing at selected circumferential areas of said rotor by moving said sleeve radially toward and away from said rotor.

3. An apparatus for producing a granular product from an admixture of a powdery material and a binder which comprises:
   (i) a cylindrical casing defining therein a compartment for receiving a granular product;
   (ii) an annular sleeve mounted in and movable eccentrically relative to said casing;
   (iii) a rotor rotatably mounted concentrically in said casing for granulating an admixture of a powdery feedstock and a liquid binder and having a plurality of blades for removing said admixture tending to deposit on said sleeve, said blades and said sleeve defining therebetween an annular circumferential spacing; and
   (iv) a plurality of shifters movable radially toward and away from said sleeve to vary said spacing at predetermined time intervals.

4. An apparatus according to claim 3 wherein said sleeve is sub-divided into a plurality of spaced arcuate sections which are movable simultaneously or independently one from another radially toward and away from said rotor.

5. An apparatus according to claim 3 wherein said rotor is movable eccentrically relative to said casing.

* * * * *